US 11,394,612 B2
Jul. 19, 2022

(12) United States Patent
Puranic et al.

(10) Patent No.: US 11,394,612 B2
(45) Date of Patent: Jul. 19, 2022

(54) DISTRIBUTED SYSTEMS AND EXTRACTING CONFIGURATIONS FOR EDGE SERVERS USING DRIVING SCENARIO AWARENESS

(71) Applicant: Toyota Motor Engineering & Manufacturing North America, Inc., Erlanger, KY (US)

(72) Inventors: Aniruddh G. Puranic, Mountain View, CA (US); BaekGyu Kim, Mountain View, CA (US)

(*) Notice: Subject to any disclaimer, the term of this patent is extended or adjusted under 35 U.S.C. 154(b) by 102 days.

(21) Appl. No.: 16/572,435

(22) Filed: Sep. 16, 2019

(65) Prior Publication Data

US 2021/0083937 A1 Mar. 18, 2021

(51) Int. Cl.
*H04L 41/0823* (2022.01)
*H04W 4/40* (2018.01)
*H04L 67/10* (2022.01)

(52) U.S. Cl.
CPC .......... *H04L 41/0823* (2013.01); *H04W 4/40* (2018.02); *H04L 67/10* (2013.01)

(58) Field of Classification Search
None
See application file for complete search history.

(56) References Cited

U.S. PATENT DOCUMENTS

| | | |
|---|---|---|
| 6,321,337 B1 | 11/2001 | Reshef et al. |
| 7,734,933 B1 | 6/2010 | Marek et al. |
| 9,240,955 B1 | 1/2016 | Mukhopadhyay et al. |
| 9,575,877 B2 | 2/2017 | Ishigooka et al. |
| 9,870,313 B2 | 1/2018 | Adir et al. |
| 9,875,175 B2 | 1/2018 | Adir et al. |
| 2009/0064111 A1 | 3/2009 | Kornerup et al. |
| 2017/0024500 A1* | 1/2017 | Sebastian ............... G06F 30/20 |
| 2018/0257683 A1* | 9/2018 | Govindappa ....... B61L 27/0077 |
| 2019/0179988 A1 | 6/2019 | Malik et al. |
| 2019/0373472 A1* | 12/2019 | Smith .................. H04L 9/3239 |
| 2020/0084202 A1* | 3/2020 | Smith .................... H04L 67/28 |

FOREIGN PATENT DOCUMENTS

| | | |
|---|---|---|
| DE | 112017002604 | 2/2019 |
| EP | 2761794 | 8/2014 |
| EP | 2761795 | 10/2018 |

* cited by examiner

*Primary Examiner* — Saumit Shah
(74) *Attorney, Agent, or Firm* — Burbage Law, P.C.; Jon-Michael Burbage

(57) ABSTRACT

The disclosure includes embodiments for designing and configuring network elements for a Vehicle-to-Everything (V2X) network. A method includes executing a set of simulations which is operable to generate configuration data that describes a configuration for a set of network elements that is formally verified. The set of network elements is included in the V2X network. The method includes configuring the set of network elements consistent with the configuration data.

20 Claims, 10 Drawing Sheets

Table 1: Example types of data from V2X network

| Characteristic | Data | Example |
|---|---|---|
| Network | Hardware constraints or specifications of edge servers and cloud server | Maximum upload and download speeds, storage capacity, processing speed, etc. |
| | Location-based data | Latitude, longitude, area of coverage, etc. |
| | Resource usages of each edge server and cloud server; a total usage of all edge servers within a specific area | Memory, CPU cycle, number of threads or parallel processes, upload and download speeds, etc. |
| Services provided by edge servers | Resource usages | Number of requests that are pending, in process, canceled, rejected or completed, etc.; service latency, etc. |

Figure 6A

Table 2: Example types of data from vehicles

| Type | Application | Example |
|---|---|---|
| Vehicle data | Safety-critical, real-time application | ADAS, HD maps, navigation, cooperative driving, etc. |
| Non-vehicle data | Real-time, non-safety-critical application | Streaming such as videos or music on-demand, social network applications, etc. |

Figure 6B

Table 3: Example tools for formal language definition, simulation and verification

| Name | Description |
|---|---|
| Breach | A simulation-based design of dynamical, cyber-physical and hybrid systems. |
| STaLiRo | A tool for temporal logic falsification of hybrid cyber-physical systems. |
| ST-Lib | A library for specifying and classifying model behaviors using standard temporal logics or hyper temporal logics |

Figure 6C

DISTRIBUTED SYSTEMS AND EXTRACTING CONFIGURATIONS FOR EDGE SERVERS USING DRIVING SCENARIO AWARENESS

BACKGROUND

The specification relates to designing and configuring network elements for a Vehicle-to-Everything (V2X) network.

Edge servers and roadside units ("RSU" if singular, "RSUs" if plural) become increasingly important in a connected-vehicle domain for V2X communications among connected vehicles. An application of the edge servers and the RSUs is in the processing and storage of various safety and time-critical vehicular services such as intelligent driving, High-Definition (HD) maps, Advanced Driver Assistance System (ADAS) service, etc. The edge servers and RSUs are configured locally (i.e., localized networks) and provide the vehicular services to vehicles in their respective Areas of Coverage ("AoC" if singular, "AoCs" if plural). Hence, the edge servers and RSUs store and process only local data and may share some information with neighboring edge servers, RSUs and a centralized cloud server.

However, these edge servers and RSUs are limited by storage capacity and computational power when compared to the centralized cloud server. Existing solutions do not provide a standardized way of designing and configuring edge servers and RSUs for providing vehicular services to the vehicles. For example, traffic accidents and traffic congestions may cause multiple vehicles present in a same scene or region to transmit similar data to a corresponding edge server or RSU. Hence, a large volume of redundant information is transmitted to the edge server or the RSU, which may lead to network congestions (in terms of shortage on communication channels, storage and computation resources, etc.).

SUMMARY

One general aspect of embodiments described herein includes a computer program product including a non-transitory memory of a computer system storing computer-executable code that, when executed by a processor, causes the processor to: execute a set of simulations which is operable to generate configuration data for a set of network elements, where the configuration data describes a configuration for the set of network elements that is formally verified so that a set of contracts is satisfied, where the set of network elements is included in a V2X network; and configure the set of network elements consistent with the configuration data. Other embodiments of this aspect include corresponding computer systems, apparatus, and computer programs recorded on one or more computer storage devices, each configured to perform the actions of the methods.

Implementations may include one or more of the following features. The computer program product where the set of network elements includes a plurality of edge servers. The computer program product where the set of simulations includes a plurality of digital twin simulations. The computer program product where the set of contracts includes at least one assume-guarantee contract for each of the network elements and at least one global contract for the V2X network. Implementations of the described techniques may include hardware, a method or process, or computer software on a computer-accessible medium.

One general aspect includes a method, including: executing a set of simulations which is operable to generate configuration data that describes a configuration for a set of network elements that is formally verified, where the set of network elements is included in a V2X network; and configuring the set of network elements consistent with the configuration data. Other embodiments of this aspect include corresponding computer systems, apparatus, and computer programs recorded on one or more computer storage devices, each configured to perform the actions of the methods.

Implementations may include one or more of the following features. The method where the set of network elements includes a plurality of edge servers. The method where the set of simulations includes a plurality of digital twin simulations. The method where a connected vehicle transmits a wireless communication using the V2X network which is configured based on the configuration data. The method where the configuration data is formally verified because a set of contracts is satisfied. The method where the set of contracts includes at least one assume-guarantee contract for each of the network elements. The method where the set of contracts includes at least one global contract for the V2X network. The method where executing the set of simulations which is operable to generate the configuration data that describes the configuration for the set of network elements that is formally verified includes: executing a first simulation to generate extracted specification data based on temporal data associated with the V2X network; creating a set of assume-guarantee contracts for the set of the network elements and a global contract for the V2X network based on one or more of user-specified specification data and the extracted specification data; and executing a second simulation to generate the configuration data that describes an optimized configuration for the set of network elements so that the set of assume-guarantee contracts and the global contract are satisfied. Implementations of the described techniques may include hardware, a method or process, or computer software on a computer-accessible medium.

One general aspect includes a system including a computer system including a non-transitory memory storing computer code which, when executed by the computer system, causes the computer system to: execute a set of simulations which is operable to generate configuration data that describes a configuration for a set of network elements that is formally verified, where the set of network elements is included in a V2X network; and configure the set of network elements consistent with the configuration data. Other embodiments of this aspect include corresponding computer systems, apparatus, and computer programs recorded on one or more computer storage devices, each configured to perform the actions of the methods.

Implementations may include one or more of the following features. The system where the set of network elements includes a plurality of edge servers. The system where the set of simulations includes a plurality of digital twin simulations. The system where a connected vehicle transmits a wireless communication using the V2X network which is configured based on the configuration data. The system where the configuration data is formally verified because a set of contracts is satisfied. The system where the set of contracts includes at least one assume-guarantee contract for each of the network elements. The system where the set of contracts includes at least one global contract for the V2X network. The system where the computer code, when executed by the computer system, causes the computer system to execute the set of simulations which is operable to generate the configuration data that describes the configuration for the set of network elements that is formally verified at least by: executing a first simulation to generate extracted specification data based on temporal data associated with the V2X network; creating a set of assume-guarantee contracts for the set of the network elements and a global contract for the V2X network based on one or more of user-specified specification data and the extracted specification data; and executing a second simulation to generate the configuration data that describes an optimized configuration for the set of network elements so that the set of assume-guarantee contracts and the global contract are satisfied. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 6A depicts an example table including multiple types of data that are measured in a V2X network and can be used in a configuration of the V2X network according to some embodiments.

FIG. 6B depicts an example table including multiple types of data received from connected vehicles according to some embodiments.

FIG. 6C depicts an example table including example tools for formal language definition, simulation and verification according to some embodiments.

DETAILED DESCRIPTION

Design and configuration of distributed systems for intelligent vehicles are challenging tasks due to their complexity, processing of large volumes of data and latency requirements, etc. Existing distributed systems do not automatically generate specifications of how the systems behave over time and provide intuitive feedback to improve an overall system performance. Existing distributed systems do not guarantee that the systems are capable of operating in adverse conditions.

Figure 1A:
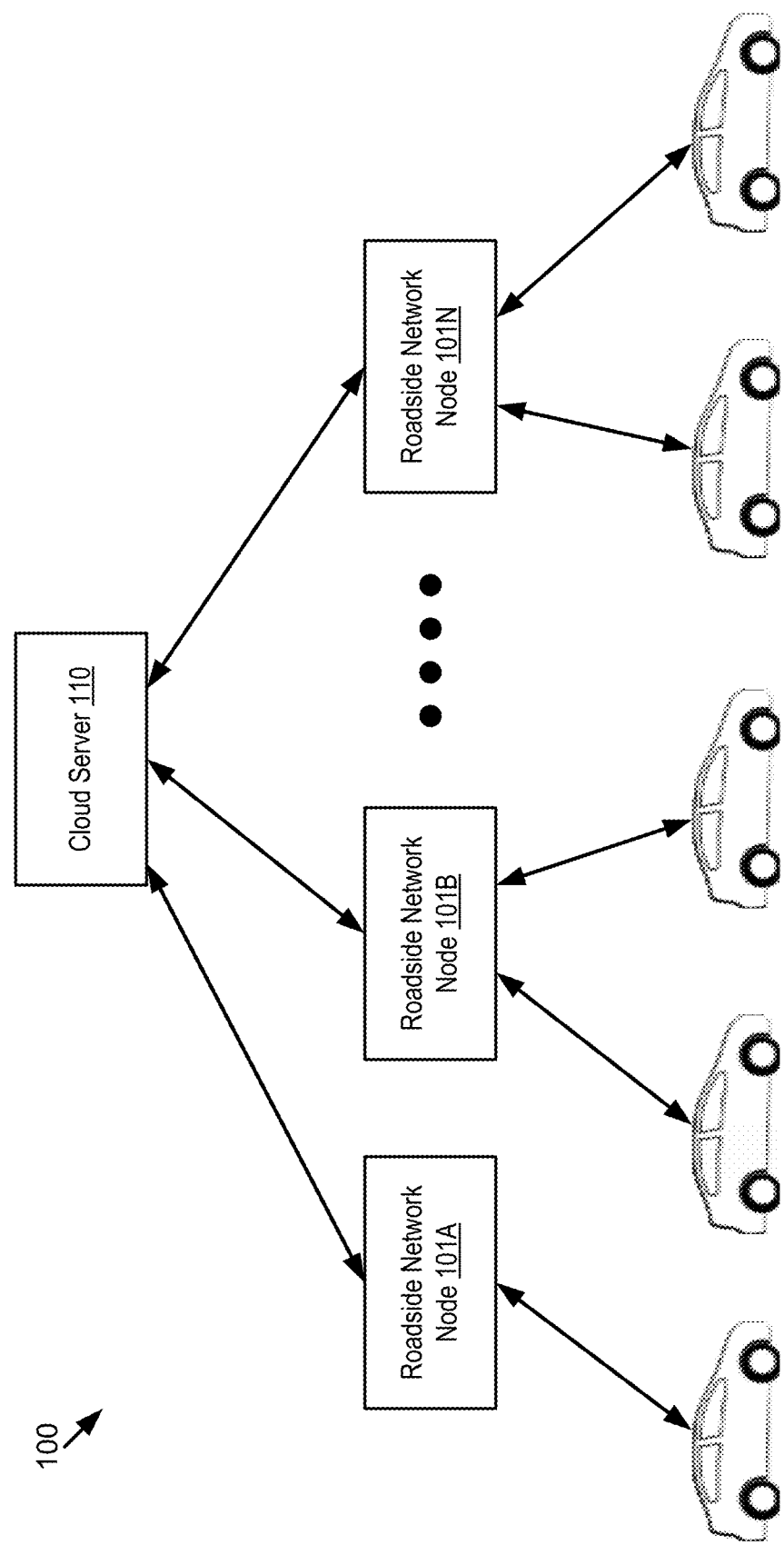
FIG. 1A is a block diagram illustrating an example distributed system architecture for connected vehicles.

For example, an example distributed system architecture 100 for connected vehicles is shown in FIG. 1A. A distributed system in FIG. 1A may include multiple roadside network nodes 101A, 101B, . . . , 101N (referred to as "roadside network node 101" individually or collectively) that are distributed in different locations. The roadside network nodes 101 communicate with corresponding connected vehicles in their respective AoCs. The roadside network nodes 101 are also communicatively coupled to a cloud server 110 via a network. In some embodiments, the roadside network nodes 101 may include edge servers, RSUs or a combination thereof.

In some scenarios, the roadside network nodes 101 are edge servers. Edge computing technology may provide an end-to-end system architecture that enables distribution of computation processes over localized networks. The edge servers also act as a medium to pre-process the local data before transmitting it to the centralized cloud server 110. The edge servers can act as "intelligent devices" themselves and perform computations to provide real-time services to the vehicles and drivers.

However, there is no existing solution that guarantees that the distributed system in FIG. 1A is capable of operating in adverse conditions. For example, traffic congestions or accidents in an area can result in similar data (e.g., redundant data) being transmitted to an edge server from multiple vehicles present in the area, thereby leading to network congestions.

In another example, a configuration of edge servers is controlled by the centralized cloud server 110. When one or more edge servers have failed (e.g., being overloaded) or are temporarily unavailable due to maintenance and upgrades, a control scheme is needed to be executed in order to distribute and regulate a data flow between the edge servers and the vehicles. There is a lack of standardized procedures to be followed during such conditions so that the data flow is not interrupted.

Described herein are embodiments of a network design system that is operable to design a distributed system for intelligent vehicles by incorporating formal techniques to provide guarantees in Quality-of-Service (QoS) under various assumptions or constraints. Here, the distributed system may include a set of network elements (e.g., edge servers, RSUs, etc.) for a V2X network. The network design system is operable to design and perform real-time network health monitoring and dynamic network resource allocation of the distributed system through formal verification. As a result, a formally verified distributed system for intelligent vehicles in various driving scenarios is created.

For example, the network design system described herein is operable to determine a configuration for the distributed system based on one or more of locations of the network elements, various traffic conditions and various road scenarios. In another example, the configuration for the distributed system is formally verified by formal techniques such as an assume-guarantee contract-based architecture that results in a formally verified distributed system design. In yet another example, the network design system allows a user (e.g., a network designer) to define custom network specifications regarding an overall operation of the V2X network. The network design system also supports automatic generation of network specifications.

Example improvements and advantages provided by the network design system described herein are provided here. For example, the network design system is capable of designing and performing real-time monitoring of a distributed system that includes formally verified network elements. An assume-guarantee contract-based architecture approach can be used to design the distributed system. The network design system can configure the formally verified distributed system based on one or more of geographical locations of the network elements, road scenarios and traffic conditions, etc.

In another example, existing solutions on distributed system programming focus on temporal logic specifications that are based on linear time intervals and that check individual traces at a time. Different from the existing solutions, the network design system described herein uses time intervals of varying lengths and orders (e.g., time can evolve exponentially), and can check multiple traces at a same time. Thus, the network design system provides various customization flexibilities for the user(s) on various applications.

In yet another example, the network design system supports real-time or runtime monitoring of the network health and extracts network specifications that are intuitive. The extracted specifications can be used to improve a configuration of the network elements in the distributed system and extract trends in network operations or workloads. The specifications can be used in various applications such as failure detection and prediction, overloading, and underutilization of network elements, etc. The network design system supports automatic specification generation so that the network elements can allocate resources dynamically based on a workload, resource utilizations and types of data (e.g., vehicular services and tasks, or non-vehicular services and tasks), etc. Other example improvements and advantages are also possible, which are not described here.

Example Overview

Figure 1B:
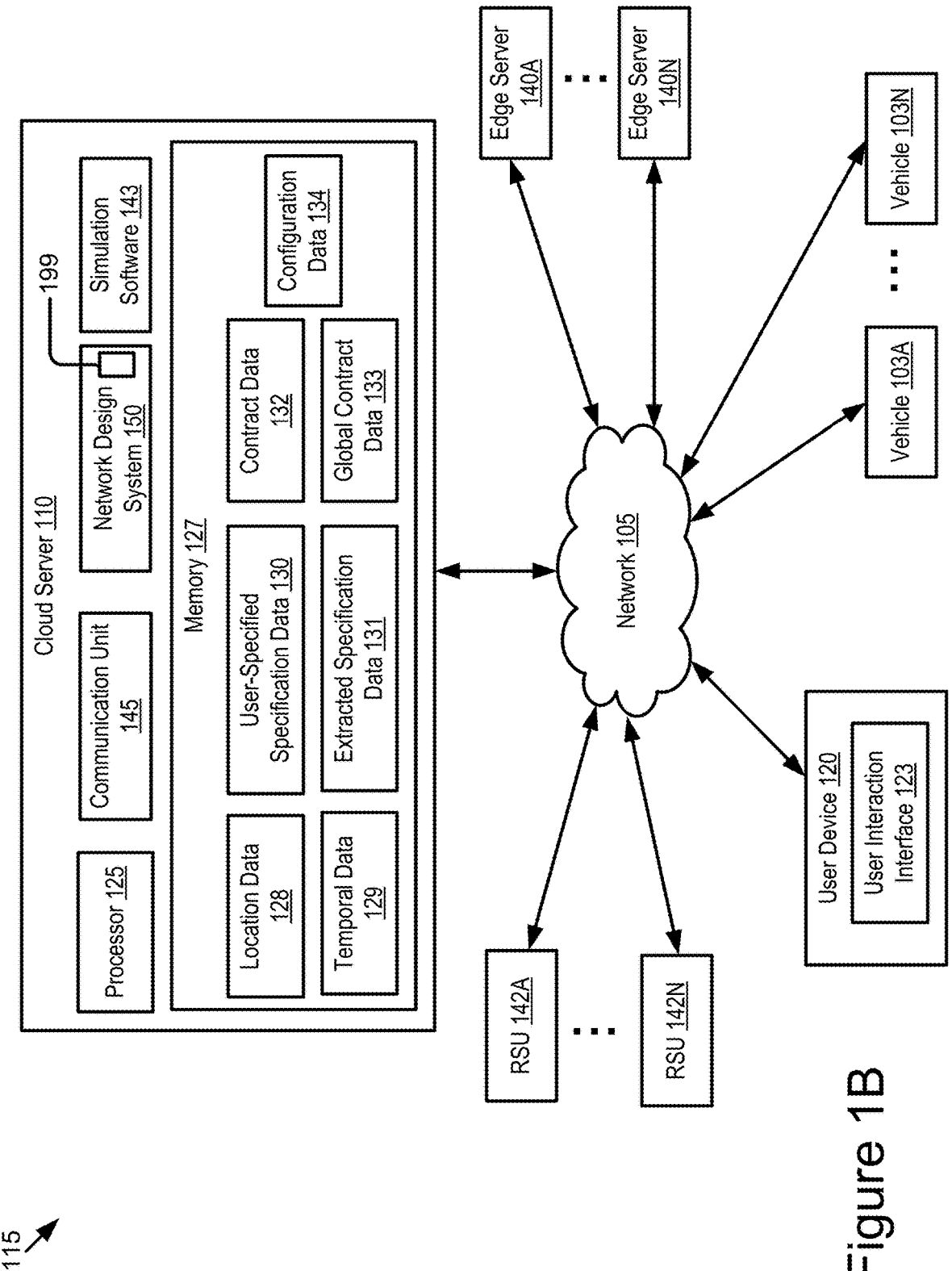
FIG. 1B is a block diagram illustrating an operating environment for a network design system according to some embodiments.

Referring to FIG. 1B, depicted is an operating environment 115 for a network design system 150 according to some embodiments. The operating environment 115 may include one or more of the following elements: a user device 120; and the cloud server 110. The operating environment 115 may also include one or more vehicles 103A, . . . , 103N (referred to as "vehicle 103" individually or collectively). The operating environment 115 may also include one or more edge servers 140A, . . . , 140N (referred to as "edge server 140" individually or collectively) and one or more RSUs 142A, . . . , 142N (referred to as "RSU 142" individually or collectively). These elements of the operating environment 115 may be communicatively coupled to a network 105. In practice, the operating environment 115 may include any number of user devices 120, cloud servers 110, edge servers 140, RSUs 142, vehicles 103 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, Dedicated Short Range Communication (DSRC), full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, Long Term Evolution (LTE), LTE-V2X, LTE-Device-to-Device (LTE-D2D), Voice over LTE (VoLTE), 5G-V2X or any other mobile data network. The network 105 may also include any combination of mobile data networks. Further, the network 105 may include one or more IEEE 802.11 wireless networks.

The cloud server 110 may be any computing device including, e.g., a centralized computing device. In some embodiments, the cloud server 110 may include one or more of the following elements: a processor 125; a memory 127; a communication unit 145; a simulation software 143; and a network design system 150. These elements of the cloud server 110 may be communicatively coupled to one another via a bus.

In some embodiments, the processor 125 and the memory 127 may be elements of a computer system (such as computer system 200 described below with reference to FIG. 2). The computer system may be operable to cause or control the operation of the network design system 150. For example, the computer system may be operable to access and execute the data stored on the memory 127 to provide the functionality described herein for the network design system 150 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures. Example computing architectures include a complex instruction set computer (CISC) architecture, a reduced instruction set computer (RISC) architecture, or an architecture implementing a combination of instruction sets. The cloud server 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The cloud server 110 may include one or more memories 127.

The memory 127 may store one or more of the following elements: location data 128; temporal data 129; user-specified specification data 130; extracted specification data 131; contract data 132; global contract data 133; and configuration data 134.

The location data 128 may include digital data describing a geographic location for each network element in a V2X network (or a distributed system) managed by the cloud server 110. The location data 128 may also include digital data describing an AoC of each network element. For example, the V2X network may include a set of network elements. The location data 128 may include digital data describing a set of geographic locations for the set of network elements and digital data describing a set of AoCs for the set of network elements. The user can specify the set of locations along with the set of AoCs for the set of network elements.

In some examples, the location of a particular network element can be precise (e.g., a location of an existing edge server that is already known, or information about a new edge server that is known beforehand). Or, the location of a particular network element can be approximate (e.g., within a certain area where the edge server can be placed).

The temporal data 129 (or referred to time-series data) may include digital data which is either input by a user (e.g., an automotive engineer) or generated by simulations. The temporal data 129 describes any measurements which vary over time. The measurements may be collected by roadway systems or observed in simulations. The measurements are collected or observed for various driving scenarios (e.g., highways, intersections, roundabouts, etc.) which vary over time. The temporal data 129 describes, for example, one or more of the following elements: resource usages of each edge server 140; resource usages of the centralized cloud server 110; and a total usage of all edge servers 140 within a specific area. In another example, the temporal data 129 includes digital data describing time-varying measurements for various traffic conditions and road scenarios.

Table 1 of FIG. 6A shows different types of data that can be collected as examples of the temporal data 129. Example simulation and verification tools that can perform these simulations for any desired period of time are shown in Table 3 of FIG. 6C.

In some embodiments, the user may specify types of data to be included in the temporal data 129. In some embodiments, the user may identify a source of the temporal data 129. For example, the user may identify a data pool that stores data collected from various driving scenarios or may specify a simulation software to run simulations for the temporal data 129.

The user-specified specification data 130 may include digital data describing user-defined specifications for network elements (e.g., edge servers). The user-specified specification data 130 may be inputted by a user of the network design system 150. In some embodiments, the user-specified specification data 130 may also include one or more hardware requirements for the network elements that are specified by the user. However, if these hardware requirements are not provided by the user, then the extracted specification data 131 may provide adequate description for the network elements (e.g., including description for the hardware requirements). The hardware requirements may include, for example, hardware constraints and specifications such as a processing speed, a storage capacity, communication requirements, etc., of each network element.

The extracted specification data 131 may include specification data for a set of network elements that is extracted from simulations. For example, the network design system 150 includes, as a sub-element of itself, a compliance system 199. In some embodiments, the compliance system 199 outputs the extracted specification data 131 for hardware (e.g., hardware requirements of the network elements) which is extracted from simulations of the hardware. These simulations are executed by the compliance system 199, and the compliance system 199 or the network design system 150 includes a simulation software (e.g., the simulation software 143) appropriate for such simulations. In some embodiments, the simulations described here are digital twin simulations. A brief description for the compliance system 199 is provided below with reference to FIG. 2.

The contract data 132 may include digital data describing a set of assume-guarantee contracts for a set of network elements. An assume-guarantee contract for a particular network element (e.g., an edge server) includes one or more of the following: (1) extracted specification data for the network element; and (2) user-specified specification data for the network element. Different network elements may include (and are likely to include) different contracts.

In some embodiments, a V2X network includes multiple network elements. The assume-guarantee contracts may be unique to each network element in the V2X network. The assume-guarantee contracts are configured so that when the contracts are kept, they guarantee or deliver an optimized performance based on certain known or unknown assumptions.

The global contract data 133 may include digital data describing a global contract. In some embodiments, a global contract is specified for the cloud server 110 which includes the network design system 150. The global contract ensures appropriate operations on each of the assume-guarantee contracts for the network elements in the V2X network that is managed by the cloud server 110.

The configuration data 134 may include digital data describing a configuration for a set of network elements. For example, the configuration data 134 describes one or more settings or values for one or more configuration parameters of the network elements. In a further example, the configuration data 134 describes optimized values for a maximum upload speed, a maximum download speed, a maximum latency, a geographic location (if the network element is movable) and any other configuration parameters for each network element. In some embodiments, the configuration data 134 describes an optimized configuration for the set of network elements that is formally verified so that a set of assume-guarantee contracts for the network elements and a global contract are satisfied.

The simulation software 143 may be used to run simulations for the generation of the configuration data 134. In some embodiments, the simulation software 143 can be part of the network design system 150. In some other embodiments, the network design system 150 can be a component or a plugin of the simulation software 143. Examples of the simulation software 143 are shown in FIG. 6C.

The communication unit 145 transmits and receives data to and from the network 105 or to another communication channel. In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods. Example wireless communication methods may include one or more of the following: IEEE 802.11; and IEEE 802.16, BLUETOOTH®.

In some embodiments, the communication unit 145 includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The user device 120 can be a computing device that is operated by a user. For example, the user device 120 can be a desktop computer, a laptop computer, a tablet computer, a smart phone, a wearable electronic device or any other electronic device that can be accessed by a network engineer or an automotive engineer. The user device 120 may include a processor and a memory that are similar to the processor 125 and the memory 127 respectively.

In some embodiments, the user device 120 includes a user interaction interface 123 so that the user can operate on the user device 120 via the user interaction interface 123. The user interaction interface 123 may include one or more of a keyboard, a mouse, a display (e.g., a touch screen), a voice control device (e.g., a microphone) and a speaker system, etc. The user may input data to the network design system 150 via the user interaction interface 123.

In some embodiments, the network design system 150 includes software that is operable to design and configure network elements for a V2X network. In some embodiments, the network design system 150 may be implemented using hardware including a field-programmable gate array ("FPGA") or an application-specific integrated circuit ("ASIC"). In some other embodiments, the network design system 150 may be implemented using a combination of hardware and software. The network design system 150 may be stored in a combination of the devices (e.g., servers or other devices), or in one of the devices.

In some embodiments, the network design system 150 is specifically designed to assist automotive engineers whose work includes ensuring that network elements of a V2X network (e.g., a set of edge servers 140, RSUs 142) are configured in a manner that is optimal.

In some embodiments, the network design system 150 provides one or more of the following example functionality. For example, the network design system 150 outputs digital data describing how a network element can be configured based on formal verification (assume-guarantee contracts). In another example, the network design system 150 monitors real-time data describing how the network is performing in the real-world. In yet another example, the network design system 150 outputs digital data describing how the network element can be re-configured based on new formal verification which is executed based on the real-time data. Each of the example functionality described above may have various sub-steps.

The network design system 150 is described below in more detail with reference to FIGS. 1C-5.

The edge server 140 can be any server on a roadside. The edge server 140 may include a processor, a memory and other storage device that are similar to those included in the cloud server 110. In some embodiments, each edge server 140 covers a limited number of vehicles 103 in a certain area (known as its AoC). For a V2X network where the network elements are edge servers 140, the edge servers 140 are each responsible for managing wireless communications in a predetermined AoC.

The RSU 142 can be any infrastructure device on a roadside. The RSU 142 may include a processor, a memory and other storage device that are similar to those included in the cloud server 110.

The vehicle 103 may be any type of vehicle. For example, the vehicle 103 may include one of the following types of vehicles: a car; a truck; a sports utility vehicle; a bus; a semi-truck; a drone; or any other roadway-based conveyance. The vehicle 103 may be a connected vehicle that includes a communication unit and is capable of communicating with other endpoints connected to the network 105.

In some embodiments, the vehicle 103 is a DSRC-enabled vehicle which includes a DSRC radio and a DSRC-compliant Global Positioning System (GPS) unit. The vehicle 103 may also include other V2X radios besides a DSRC radio. DSRC is not a requirement of embodiments described herein, and any form of V2X communications is also feasible. Further examples of V2X communications include the following: LTE; millimeter wave (mmWave) communication; 3G; 4G; 5G; LTE-V2X; 5G-V2X; LTE-Vehicle-to-Vehicle (LTE-V2V); LTE-D2D; or VoLTE; etc. In some examples, the V2X communications can include V2V communications, Vehicle-to-Infrastructure (V2I) communications, Vehicle-to-Network (V2N) communications or any combination thereof.

The vehicle 103 may include a sensor set for recording sensor data that describes one or more sensor measurements. In some embodiments, the sensor set includes one or more sensors that are operable to measure a roadway environment outside of the vehicle 103. For example, the sensor set may include one or more sensors that record one or more physical characteristics of the roadway environment that is proximate to the vehicle 103. In some embodiments, the sensor set may also include various sensors that record an environment internal to a cabin of the vehicle 103. For example, the sensor set includes onboard sensors which monitor the environment of the vehicle 103 whether internally or externally. In a further example, the sensor set includes cameras, LIDAR, radars, infrared sensors and sensors that observe the behavior of a driver such as internal cameras, biometric sensors, etc.

For example, the sensor set may record vehicle data of the vehicle 103 (e.g., data related to safety-critical real-time applications such as ADAS, HD maps, etc.). In another example, the sensor set may record non-vehicle data for the vehicle 103 (e.g., data related to non-safety-critical real-time applications such as video streaming). The vehicle 103 may send the vehicle data and the non-vehicle data to the network design system 150. Examples of the vehicle data and the non-vehicle data are shown in Table 2 of FIG. 6B.

Figure 1C:
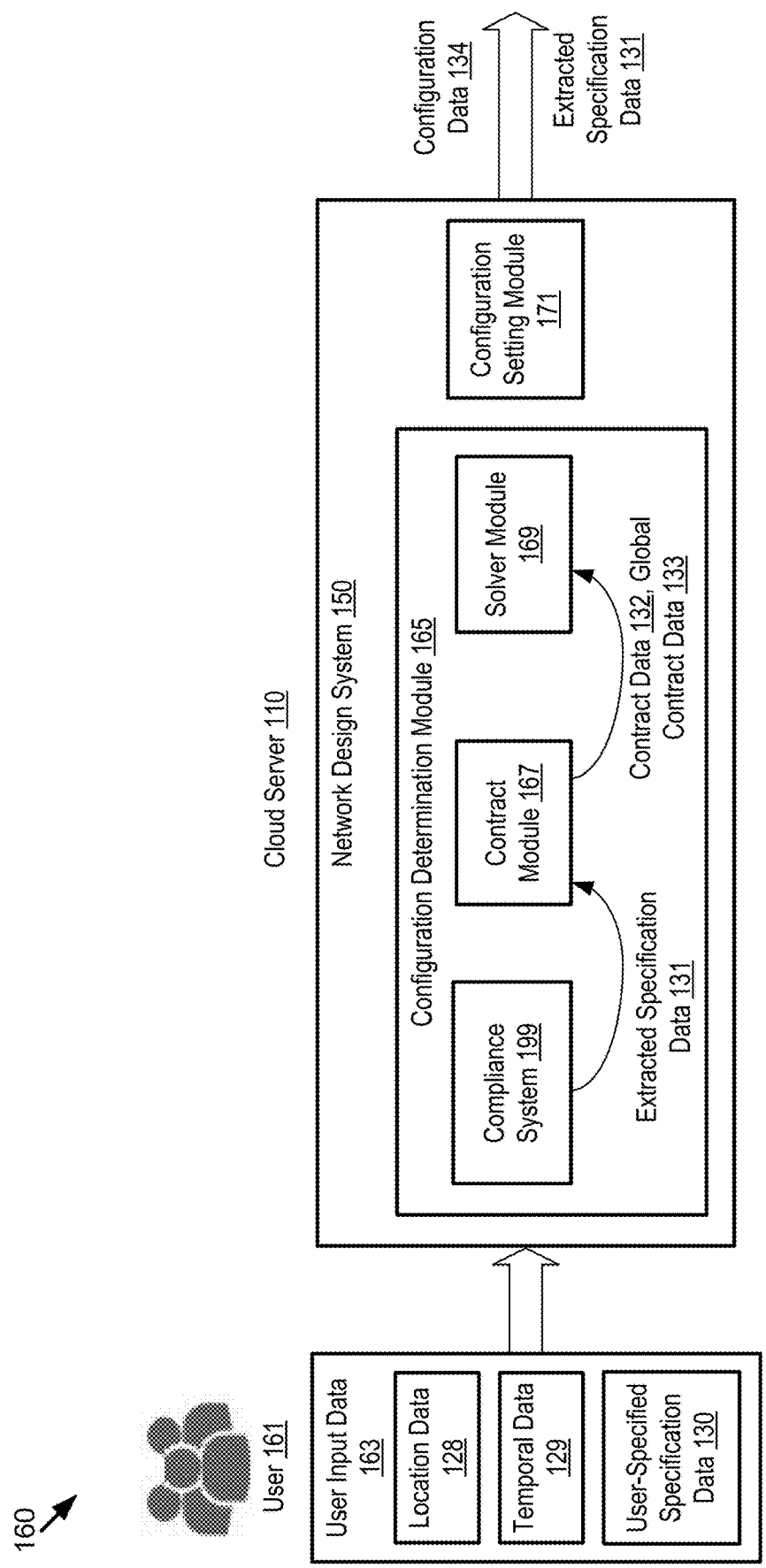
FIG. 1C is a block diagram illustrating a framework for the network design system according to some embodiments.

Referring to FIG. 1C, a framework 160 for the network design system 150 is illustrated according to some embodiments. In some embodiments, a user 161 involved in the design and configuration of the network elements may provide user input data 163 that includes one or more of the following: the location data 128; the temporal data 129; and the user-specified specification data 130.

In some embodiments, through the user input data 163, the user can specify types of data to be considered when designing a configuration for a set of network elements. The user can choose a possible landmark or location and an AoC for each network element to be placed in a region. As described below in more detail, some configuration parameters of the network elements can be tuned by the network design system 150. However, for an existing network element, its location can be considered as a constant if it is not movable or a tunable configuration parameter if it is movable.

The network design system 150 receives the user input data 163 and generates an optimal configuration for the set of network elements for a V2X network based at least in part on the user input data 163. In some embodiments, the network design system 150 includes a configuration determination module 165 and a configuration setting module 171. The configuration determination module 165 includes one or more of the following elements: the compliance system 199; a contract module 167; and a solver module 169.

Based on the temporal data, the compliance system 199 may extract other specifications which are not initially specified by the user 161 by using statistical analysis. As a result, the compliance system 199 outputs the extracted specification data 131 describing one or more extracted specifications of the network elements to the contract module 167.

The contract module 167 is operable to form a set of contracts based on specification data of the network elements (e.g., including the user-specified specification data 130, the extracted specification data 131, or a combination thereof).

In some embodiments, the set of contracts includes a set of assume-guarantee contracts for the set of network element. The contract module 167 generates the set of assume-guarantee contracts based on one or more of the user-specified specification data 130 and the extracted specification data 131. The set of assume-guarantee contracts may be unique to each network element in the V2X network (e.g., different network elements may have different assume-guarantee contracts).

In some embodiments, the set of contracts also includes a global contract. The contract module 167 generates a global contract for the cloud server 110 to ensure appropriate operations on each of the assume-guarantee contracts for the network elements in the V2X network managed by the cloud server 110.

The contract module 167 outputs (1) the contract data 132 describing the set of assume-guarantee contracts and (2) the global contract data 133 describing the global contract to the solver module 169.

The solver module 169 is operable to perform an optimization on all the contracts and generate the configuration data 134 describing an optimized configuration of the network elements that results in an optimized performance. The configuration data 134 may include optimal values for configuration parameters of the network elements.

For example, the solver module 169 analyzes the contract data 132, the global contract data 133 and the temporal data 129 to generate the configuration data 134. The configuration data 134 describes a configuration for the network elements that ensures appropriate operation of the network elements because it satisfies: each of the assume-guarantee contracts for the network elements; and the global contract for the network. This process is a formal verification because the contracts need to be satisfied.

In some embodiments, the solver module 169 executes simulations in order to find a configuration that satisfies each of the assume-guarantee contracts and the global contract best. Optionally, the simulations described here are digital twin simulations.

The configuration setting module 171 may configure the network elements based on the configuration data 134.

In some embodiments, the network design system 150 may output one or more of the configuration data 134, the extracted specification data 131, the contract data 132 and the global contract data 133 to the user interaction interface 123. Then, the user 161 may review and modify the corresponding data using the user interaction interface 123. An iterative process can be used to modify assumptions and guarantees on the contracts. Since the contracts are exhaustively searched and verified using formal theory, a resulting configuration is considered to be formally proved or verified and can be deployed anywhere and in any situation.

The configuration determination module 165 (including the compliance system 199, the contract module 167 and the solver module 169) and the configuration setting module 171 are described below in more detail with reference to FIGS. 2-5.

A specific example that illustrates operations of the network design system 150 is provided here. In this example, assume that a V2X network includes a set of edge servers 140 which are each responsible for managing wireless communications within a predetermined geographic region. The V2X network provides V2X services for a geographic area that includes a plurality of geographic regions.

In this example, a user may have access to the cloud server 110. The edge servers 140 are managed by the cloud server 110. The cloud server 110 includes the network design system 150. The user inputs user-specified specification data and temporal data (optional) into the network design system 150. The network design system 150 executes simulations to generate: (1) extracted specification data; (2) contract data; (3) global contract data; and (4) some additional temporal data. The network design system 150 also executes simulations to generate configuration data that describes one or more values for one or more configuration parameters, where the configuration data satisfies each of the assume-guarantee contracts and the global contract.

The user reviews the extracted specification data and may optionally run the process over again with different user-specified specification data or temporal data based on his/her judgment about the correctness of the output(s) of the network design system 150. The user causes the edge servers 140 of the V2X network to be configured based on the configuration data. The V2X network operates for a certain period of time. As the V2X network is operated, new temporal data (as well as other data) is reported to the cloud server 110 as feedback data. The network design system 150 monitors this feedback data and may execute its processes over to generate new configuration data based on the performance of the configuration as indicated in the real-world by the feedback data.

To facilitate discussion of the network design system 150 below, it is noted that the network elements (e.g., edge servers) need to provide services by taking the following two requirements into consideration. Examples to fulfill the two requirements are described below with reference to FIG. 2.

A first requirement in consideration is a requirement on data generation, traffic rates and response times. For example, real-time applications require fast response times or small latency from the network elements so that the response times of the network elements need to be taken into consideration when designing the network elements. In another example, traffic rates correspond to variations in volumes of data generated by vehicle applications or non-vehicle applications. Also, cloud computing services need to be flexible to allocate a correct amount of resources dynamically according to a size of the generated data. Thus, a price of dynamic allocation needs to be considered while designing the edge servers 140.

A second requirement in consideration is a requirement on load balancing and distribution. This requirement corresponds to a distribution of resources (e.g., a distribution on locations of the network elements, storage capacity, communication bandwidth and computation power, etc.) so that a total usage of these resources is optimized. Also, it is desirable if the data is uniformly distributed throughout a region of coverage. This requirement is used to avoid concentration of data only on a single network element or a few network elements.

To facilitate discussion of the network design system 150 below, a brief description for temporal logics and specifications of the network elements expressed using temporal logics is described here. Since operations of a distributed system in the automotive domain are time-dependent, formal methods such as temporal logics are appropriate to express various properties and specifications of the system. Conventionally, temporal logics are used to express properties of a single execution or trace of the system. However, a limitation is that they are computationally expensive since they require multiple executions (or traces) of the system to be generated before performing any operations (such as comparison between traces). To overcome this limitation, the network design system 150 described herein uses hyper temporal logics that can express quantification over multiple (at least 2) traces.

Temporal logics are a formalism for expressing the temporal data and properties of systems and are used to reason about the behaviors of the systems. The semantics of temporal logics can be expressed in natural language as well as using the Boolean logic of computers. The temporal logics are widely used in verification, model checking, falsification (a process of identifying undesired behaviors in systems), etc. The temporal logics can be used to compare single time-series executions or traces of a system with ground truth numbers or compare multiple time-series traces of the system. Some examples of temporal specifications based on the number of traces used or checked by the specifications are as follows:

Single trace: Linear Temporal Logic (LTL), Metric Temporal Logic (MTL), Signal Temporal Logic (STL), Computational Tree Logic (CTL), Parametric STL, etc.; and Multiple traces (hyper temporal logics): CensusSTL, HyperLTL, HyperCTL, HyperSTL, etc.

A temporal specification includes one or more temporal logics. Each temporal logic includes one or more atomic logics combined with one or more temporal-logic operators. An atomic logic includes a Boolean-valued expression which determines the truth or falsity of the expression. Examples of an atomic logic include: (a>b); and (4<=9), etc. For example, atomic predicates are expressions involving standard Boolean logic operators such as AND, OR, XOR, →(implications), etc. A temporal-logic operator quantifies the atomic logic in a given time interval. For example, semantics for some example temporal-logic operators includes:

F_[t1, t2] (S1), which means that an atomic logic S1 is true for at least one-time step anywhere in a time interval [t1, t2];

G_[t1, t2] (S1), which means that an atomic logic S1 holds true at all time steps in the time interval [t1, t2]; and (S1) U_[t1, t2] (S2), which is a binary operator on two atomic logics S1 and S2 and means that a precedent logic S1 holds true for all time steps until at some time steps in the interval [t1, t2] at which an antecedent logic S2 becomes true.

An example for a temporal logic is: G_[0, 5] (A=>B), where A and B are atomic logics and G[0, 5] indicates that an implication statement (e.g., A=>B) holds to be true at all time steps in a time interval [0, 5].

A satisfaction of a system with respect to a temporal logic is characterized by a robustness measurement that indicates a degree to which a time-series data or trace of the system satisfies the temporal logic. A higher robustness value (or measurement) indicates a higher robustness. For example, assume that a logic to test is (x[t]>=8) at time t and a value of the data at time t is x[t]=30. Then, a robustness value at time t is simply r=30−8 =22. In another example, assume that an atomic logic of a temporal logic with a time interval [t0, t1] is (x[t]>=$x_0$) and a value of the data x at time t is x[t]=$x_t$. Then, a robustness value at time t is r(t)=$x_t$−$x_0$. A robustness measurement for the temporal logic is an average of the robustness values at the entire time interval [t0, t1], which is $$\frac{1}{t_1 - t_0} \sum_{t=t_0}^{t_1} r(t) = \frac{1}{t_1 - t_0} \sum_{t=t_0}^{t_1} (x_t - x_0).$$

Hence, the robustness is also a measurement of deviation of the data from the temporal specification. A negative robustness (e.g., a negative robustness value or a negative robustness measurement) implies that the system is unstable or has a poor design.

The hyper temporal logics are useful to express stochastic performances of systems and relationship between behaviors. The hyper temporal logics generalize the formal properties of the system by considering sets of sets of execution traces, S={Set_1, Set_2, . . . , Set_M}, where each Set_i={Trace_1, Trace_2, Trace_3, . . . , Trace_N}, i=1, 2, . . . , M. Using this type of temporal logics, multiple traces of the system can be analyzed in parallel, which can reduce the computational time. The hyper temporal logics can be used to extract behavior patterns of multiple network elements based on spatial-temporal data and can also identify nodes in the network that behave similarly or complementarily for certain tasks.

Example specifications that can be expressed using the hyper temporal logics are provided here. For example, for a response time of each edge server 140, an example specification can describe "an average time that elapses between a user's (or vehicle's) request and response over all executions should be less than 1 second." It is not possible to express this specification with plain temporal logics as the plain temporal logics involve only checking individual traces. Hyper temporal logics can be used to evaluate this specification over all the system execution traces.

In another example, for resilience of the entire distributed network, an example specification can describe "for a given set of hardware constraints for each edge server, the V2X network is able to provide all services during any allowable disturbances." The disturbances can include failure of one or more edge servers 140 or resource overload, etc. This specification guarantees that the V2X network can still deliver QoS under such adversarial circumstances.

In yet another example, for consistency in the number of edge servers in operation within a large region including multiple areas, an example specification can describe "at any given time, there should be at least 'p' number of edge servers in operation within the monitored areas." This specification helps in the design of redundant edge servers in areas which have a lot of communication activities.

Example Computer System

Figure 2:
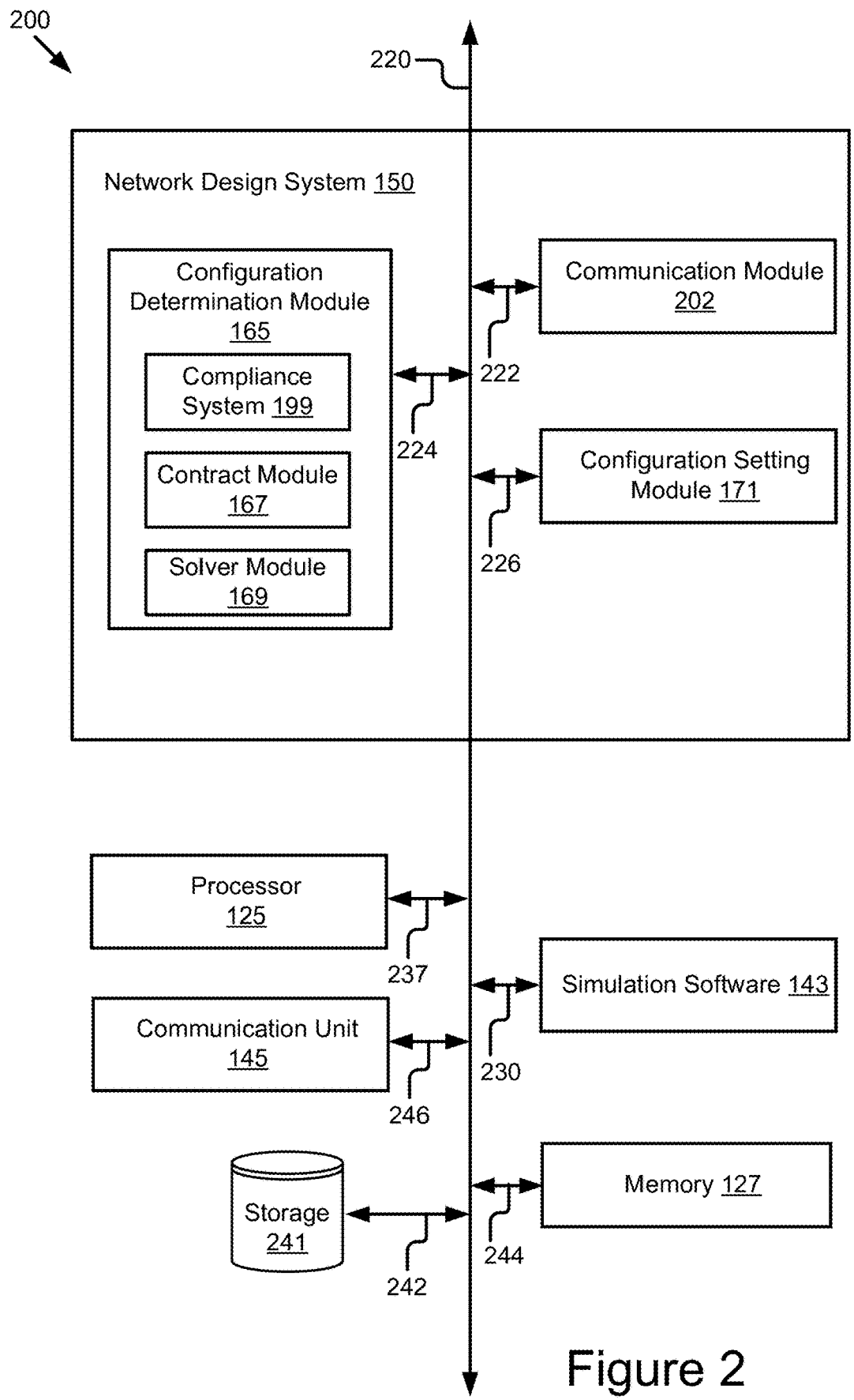
FIG. 2 is a block diagram illustrating an example computer system including the network design system according to some embodiments.

Referring now to FIG. 2, depicted is a block diagram illustrating an example computer system 200 including the network design system 150 according to some embodiments. In some embodiments, the computer system 200 may include a special-purpose computer system that is programmed to perform one or more steps of a method 300, an operational sequence 400 and a flowchart 500 described below with references to FIGS. 3-5.

In some embodiments, the computer system 200 may be an element of the cloud server 110. In some embodiments, the computer system 200 may be an element of the user device 120, the edge server 140 or the RSU 142.

The computer system 200 may include one or more of the following elements according to some examples: the network design system 150; the processor 125; the communication unit 145; the memory 127; the simulation software 143; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The storage 241 is communicatively coupled to the bus 220 via a signal line 242. The simulation software 143 is communicatively coupled to the bus 220 via a signal line 230. The memory 127 is communicatively coupled to the bus 220 via a signal line 244.

The following elements are described above with reference to FIG. 1B: the processor 125; the communication unit 145; the simulation software 143; and the memory 127. Those descriptions will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2, the network design system 150 includes: a communication module 202; the configuration determination module 165; and the configuration setting module 171. These components of the network design system 150 are communicatively coupled to each other via the bus 220. In some embodiments, components of the network design system 150 can be stored in a single server or device. In some other embodiments, components of the network design system 150 can be distributed and stored across multiple servers or devices.

The communication module 202 can be software including routines for handling communications between the network design system 150 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 115. For example, the communication module 202 transmits, via the communication unit 145, configuration data to the user device 120. The communication module 202 may send or receive any of the data or messages described above with reference to FIGS. 1A-1C via the communication unit 145.

In some embodiments, the communication module 202 receives data from the other components of the network design system 150 and stores the data in one or more of the storage 241 and the memory 127. The other components of the network design system 150 may cause the communication module 202 to communicate with the other elements of the computer system 200 or the operating environment 115 (via the communication unit 145). For example, the configuration determination module 165 may use the communication module 202 to communicate with the simulation software 143 and cause the simulation software 143 to run a set of simulations.

The configuration determination module 165 can be software including routines for determining a configuration for a set of network elements. In some embodiments, the configuration determination module 165 can be stored in the memory 127 of the computer system 200 and can be accessible and executable by the processor 125. The configuration determination module 165 may be adapted for cooperation and communication with the processor 125 and other components of the computer system 200 via a signal line 224.

In some embodiments, the configuration determination module 165 receives one or more of: location data describing a set of locations and a set of AoCs for a set of network elements; and user-specified specification data for the set of network elements. The configuration determination module 165 may also receive temporal data associated with a V2X network that includes the set of network elements. In some embodiments, the configuration determination module 165 may execute one or more simulations using one or more tools shown in FIG. 6C to obtain the temporal data.

The configuration determination module 165 executes a set of simulations which is operable to generate configuration data that describes a configuration for the set of network elements that is formally verified. In some embodiments, the configuration determination module 165 generates the configuration data based on one or more of the location data, the temporal data and the user-specified specification data. In some embodiments, the set of simulations includes a plurality of digital twin simulations. In some embodiments, the configuration data is formally verified because a set of contracts is satisfied. For example, the set of contracts includes at least one assume-guarantee contract for each of the network elements and at least one global contract for the V2X network.

For example, the configuration determination module 165 executes a first simulation to generate extracted specification data based on the temporal data associated with the V2X network. The configuration determination module 165 creates a set of assume-guarantee contracts for the set of the network elements and a global contract for the V2X network based on specification data of the network elements. The specification data of the network elements may include one or more of the user-specified specification data and the extracted specification data of the network elements. The configuration determination module 165 executes a second simulation to generate the configuration data that describes an optimized configuration for the set of network elements so that the set of assume-guarantee contracts and the global contract are satisfied.

In some embodiments, the configuration determination module 165 may include one or more of the following elements: the compliance system 199; the contract module 167; and the solver module 169. Operations of the configuration determination module 165 are described below with respect to the compliance system 199, the contract module 167 and the solver module 169 respectively.

In some embodiments, the compliance system 199 is operable to generate the extracted specification data for the set of network elements based on the temporal data. For example, the compliance system 199 causes the simulation software 143 to run a set of simulations which simulates an operation of the hardware in a set of simulation environments. The set of simulations is seeded with the temporal data. As a result of running the set of simulations, the compliance system 199 obtains intermediate output data from the simulation software 143 and generates simulation data from the intermediate output data. For example, the compliance system 199 computes various statistics data such as a mean, variances, etc., on the intermediate output data. The compliance system 199 may also conduct a curve approximation (or curve-fitting) process to extract an optimal (or minimum) number of curves (e.g., lines, splines, quadratic, cubic, etc.) that accurately represent the intermediate output data. These curves represent atomic predicates for a temporal specification of the hardware. The generated simulation data may include the various statistics data and the various curves obtained from the curve approximation (or curve-fitting) process (e.g., including the atomic predicates).

Based on defined semantics of temporal logics and natural language and the simulation data, the compliance system 199 executes a search mechanism to generate a set of candidate temporal logics. For example, the set of candidate temporal logics are generated using one or more atomic predicates included in the simulation data. The search mechanism can employ different search strategies (e.g., exhaustive, selective, guided, heuristic-based, etc.) for a higher efficiency. The compliance system 199 computes a robustness measurement of each candidate temporal logic so that a set of robustness measurements are generated for the set of candidate temporal logics. The compliance system 199 extracts a temporal logic for the hardware from the set of candidate temporal logics. For example, the extracted temporal logic is a candidate temporal logic that satisfies the simulation data (e.g., that satisfies the atomic predicates in the simulation data) and has a maximum robustness measurement among the set of candidate temporal logics.

The compliance system 199 is further described in U.S. application Ser. No. 16/536,247, titled "Extracting Temporal Specifications of Features for Functional Compatibility and Integration with OEMs," filed on Aug. 8, 2019, the entirety of which is incorporated herein by reference.

The contract module 167 is operable to form a set of contracts based on specification data of the network elements. The specification data may include the user-specified specification data, the extracted specification data, or a combination thereof.

Specifically, for the first requirement on "data generation, traffic rates and response times," the contract module 167 may create one or more assume-guarantee contracts and a global contract to ensure optimal operations of the network elements. For example, an assume-guarantee contract for each network element describes:

"When a current upload speed and a current download speed are within capable limits and a current memory is less than a maximum capacity, then the network element needs to have a latency less than a specified amount of time."

In terms of hyper temporal logics, this example assume-guarantee contract can be represented in the following Expression (1):

$$C := G(((\text{currUpSpeed}[i] <= \text{maxUpSpeed}) \text{ AND } (\text{currDownSpeed}[i] <= \text{maxDownSpeed}) \text{ AND } (\text{currUtilization}[i] <= \text{maxCapacity})) \rightarrow (\text{latency}[i] <= t)). \quad (1)$$

Here, 'i' represents a time instance. A current upload speed at the time instance i is represented as currUpSpeed[i]. A current download speed at the time instance i is represented as currDownSpeed[i]. A current utilization of the memory at the time instance i is represented as currUtilization[i]. A latency of a response time at the time instance i is represented as latency[i]. A current status of the network element is described by one or more of the following state parameters that are indexed by the time instance i: currUpSpeed[i]; currDownSpeed[i]; currUtilization[i]; and latency[i]. The state parameters can be used as inputs to the solver module 169 described below when optimizing a configuration of the network elements.

The various configuration parameters used in this contract include a maximum upload speed (maxUpSpeed), a maximum download speed (maxDownSpeed), a maximum capacity of the memory (maxCapacity) and the specified amount of time (t). The specified amount of time "t" can depend on the type of application. An application such as an ADAS may have 10 milliseconds as a maximum latency, while an HD map updating, or traffic monitoring can have a maximum latency of 1 second.

In some embodiments, a specification for a network element is independent of specifications of other network elements. That is, the specification is customized for each network element (e.g., each network element may have a customized assume-guarantee contract). For example, different network elements may have different requirements on a maximum upload speed, a maximum download speed and a specified amount of time, etc. Hence, there is a need to use hyper temporal logics since they can be used in the formal verification of multiple systems at the same time.

In the above Expression (1), locations and AoCs of the network elements are not included in the contract. It is straightforward to modify the contract in Expression (1) to incorporate location data into the contract. An example assume-guarantee contract for each network element that takes location data into consideration describes the following:

$$C := G(((\text{currUpSpeed} <= \text{maxUpSpeed}) \text{ AND } (\text{currDownSpeed} <= \text{maxDownSpeed}) \text{ AND } (\text{currUtilization} <= \text{maxCapacity}) \text{ AND } (\text{location}, AoC)) \rightarrow (\text{latency} <= t)). \quad (2)$$

A further modification to the assume-guarantee contract in Expression (1) or (2) is to add another predicate to consider input noises or disturbances that can represent spikes or surges in data. Then, the QoS is guaranteed even under the disturbances. A direct application of this modified contract is in analyzing a network response time between a vehicle and an edge server 140 (and the cloud server 110) that includes a deviation from a specified latency. This is helpful in some service scenarios, such as a vehicle-control application based on real-time information (e.g., continuously updating positions of other vehicles and pedestrians by a vehicle).

For the cloud server 110, an example global contract may describe "when at least one of the network elements in the network is in operation, a total resource utilization of the cloud server is above a minimum threshold but not exceeding its limits."

More formally expressed in temporal logics, the global contract can be written in the following Expression (3):

$$C := G((C\_1[i] \text{ OR } C\_2[i] \text{ OR } \ldots \text{ OR } C\_N[i]) \rightarrow (\text{minUtilization} <= \text{currUtilization}[i] <= \text{maxUtilization})). \quad (3)$$

Here, 'i' represents a time instance and "C_j[i]" represents a specification (equivalently, a contract) of a network element j at the time instance i. The network element j belongs to a region of the cloud server 110, where the cloud server 110 includes "N" network elements. In some embodiments, "C_j[i]" may have a form similar to that of Expression (1) or Expression (2) described above. Additional configuration parameters used in the contract in Expression (3) include the number of network elements (N) and a minimum utilization of the memory (minUtilization).

Similarly, for the second requirement on "load balancing and distribution," the contract module 167 may create one or more assume-guarantee contracts and a global contract to ensure optimal operations of the network elements.

For example, heavy vehicular traffic in a certain region can cause connected vehicles present in the region to transmit a lot of redundant or similar information to the network elements. This results in network congestions, where the service demands of the vehicles exceed a resource capacity of the network elements. There can also be times when a network element is unavailable due to maintenance, system failures, etc. In these anomaly situations, data needs to be offloaded from an affected network element to a neighboring network element or the cloud server 110 to provide uninterrupted services to the vehicles. Hyper temporal logics can be used to compare current operational status (or performances) of two or more neighboring network elements. The configuration determination module 165 can use pair-wise specification checking to decide which network element the data can be offloaded to so that there is a seamless transition and flow for V2X communications in the anomaly situations.

For example, the contract module 167 can create an assume-guarantee contract for pair-wise comparison: "if a current load on an affected network element is 'X', then this load needs to be offloaded/distributed to a neighboring network element." This contract on the neighboring network element is then dynamically formulated using hyper temporal logics as follows:

$$C := G(((currUpSpeed \leq maxUpSpeed) \text{ AND} \\ (currDownSpeed \leq maxDownSpeed) \text{ AND (cur-} \\ rUtilization+X \leq maxCapacity)) \rightarrow (latency \leq t)). \quad (4)$$

It can be observed that the load on the neighboring network element may increase by an amount of "X." The contract module 167 can further generalize Expression (4) to "k" neighboring network elements as follows:

$$C := G(((currUpSpeed \leq maxUpSpeed) \text{ AND} \\ (currDownSpeed \leq maxDownSpeed) \text{ AND (cur-} \\ rUtilization+(X/k) \leq maxCapacity)) \rightarrow \\ (latency \leq t)). \quad (5)$$

In Expression (5), the load "X" is equally divided among "k" other network elements. However, the division of the load "X" can also be based on a proximity of the neighboring network elements to the affected network element. For example, a portion of the load "X" that is offloaded to the nearest neighboring network element can be up to a value that makes the nearest neighboring network element reach its maximum capacity. Other neighboring network elements that are further away gradually decrease their portions of the load "X" according to their distances to the affected network element.

The contract module 167 can specify a global contract for the cloud server 110 as follows to guarantee low latency services in times of network adversaries:

$$C := G((C\_1 \text{ OR } C\_2 \text{ OR } \ldots \text{ OR } C\_k) \rightarrow \\ (latency \leq t)). \quad (6)$$

Here, C_1, . . . , C_k represent contracts for the "k" neighboring network elements 1, 2, . . . , k, respectively.

In some embodiments, the configuration parameters of the network elements are tunable by the user. For example, the configuration parameters shown in the above Expressions (1)-(6) can be tuned by the user.

In some embodiments, the solver module 169 may formalize a configuration of the configuration parameters as an optimization problem to select optimized values for these parameters that improve a configuration performance based on the inputs. Here, the inputs may describe a current state of each network element, a current state of the cloud server 110 or any combination thereof. For example, the inputs include a currUpSpeed[i], a currDownSpeed[i], a currUtilization[i] and a latency[i] of each network element as well as the cloud server 110.

The solver module 169 computes optimized values for the configuration parameters based on a robustness of each specification of the network elements (e.g., a robustness of each contract that is expressed in temporal logics). In mathematical terms, the solver module 169 may express the optimization problem as:

Optimal Configuration Parameter Set:=Max(Robust(Contract Set)), subject to one or more constraints which are specified by the user.

Example constraints include N>=1 (there exists at least one network element), and t<=20 ms (the latency is less than or equal to 20 milliseconds), etc.

Here, "Robust(Contract Set)" is a numerical value that quantifies a degree to which the V2X network including the set of network elements satisfies the set of contracts (Contract Set). For example, "Robust(Contract Set)" can represent a robustness value of the set of contracts or a robustness measurement of the set of contracts. A positive number of "Robust(Contract Set)" indicates an acceptable result (i.e., the set of contracts is satisfied) while a negative number of "Robust(Contract Set)" indicates an unacceptable result (i.e., the set of contracts is not satisfied).

The "Max" function represents an optimization function that selects a set of values for a set of configuration parameters that produces a maximum robustness with respect to the set of contracts (e.g., a maximum value of "Robust (Contract Set)"). For example, the solver module 169 executes the "Max" optimization function by conducting an exhaustive search on all possible values for the set of configuration parameters and obtains a set of optimized values that maximizes "Robust(Contract Set)." An example of the "Max" optimization function can be a constraint satisfaction problem solved using SAT, SMT solvers, etc.

The solver module 169 may generate configuration data describing an optimized configuration of the network elements. For example, the configuration data may include the set of optimized values for the set of configuration parameters that maximizes "Robust(Contract Set)." In some embodiments, the configuration data may include optimized values for a maximum upload speed (maxUpSpeed) and a maximum download speed (maxDownSpeed) for each network element. The configuration data may further include optimized values for a maximum capacity of the memory (maxCapacity), a minimum capacity of the memory (mimCapacity) and a specified amount of time (t) for each network element. In some embodiments, the configuration data may include a number of network elements to be placed at or around specific locations (or regions) (e.g., an optimized value for "N") and resource capacities that need to be allocated to each network element, etc.

In some embodiments, the solver module 169 may perform a search for the optimized values for the configuration parameters using formal verification tools such as those listed in Table 3 of FIG. 6C.

The configuration setting module 171 can be software including routines for configuring the set of network elements based on the configuration data. In some embodiments, the configuration setting module 171 can be stored in the memory 127 of the computer system 200 and can be accessible and executable by the processor 125. The configuration setting module 171 may be adapted for cooperation and communication with the processor 125 and other components of the computer system 200 via a signal line 226.

In some embodiments, the configuration setting module 171 receives the configuration data from the solver module 169. The configuration setting module 171 configures the set of network elements included in a V2X network to be consistent with the configuration data. For example, the configuration setting module 171 configures the configuration parameters in the set of network elements using the optimized values included in the configuration data. As a result, a connected vehicle can transmit a wireless communication using the V2X network which is configured based on the configuration data. For example, the connected vehicle can transmit data to the cloud server 110 via an edge server 140 that is configured based on the configuration data.

From the above description for FIG. 2, it can be seen that the network design system 150 uses formal verification to configure a set of network elements (e.g., edge servers 140) that are communicatively coupled to one another to form a V2X network. The network design system 150 uses simulations (e.g., digital twin simulations) to generate extracted simulation data for roadway infrastructure or network elements. The network design system 150 uses simulations (e.g., digital twin simulations) to generate configuration data that may satisfy a set of contracts including (1) a global contract and (2) a set of assume-guarantee contracts. A satisfaction of the set of contracts is operable to optimally configure the network elements used for V2X communications in a geographic area.

It can also be seen that the network design system 150 is capable of designing and configuring a V2X network that includes a set of network elements to provide services for intelligent vehicles in different driving scenarios. The network design system 150 uses a contract-based architecture to formally reason about an operation of the V2X network and provide guarantees in the QoS. The network design system 150 extracts valuable real-time information about the behaviors of the V2X network and the network elements that are easily expressed in natural language and intuitive for feedback and further refinements of the system design. The network design system 150 provides facilities to automatically adjust configuration parameters for the V2X network on behalf of the users and can enable the network elements to provide optimal operational performance.

Multiple example use cases of the network design system 150 are provided here. Other example use cases are also possible.

A first example use case of the network design system 150 is in distributed network health monitoring. In this example use case, the network design system 150 can extract multiple specifications from the temporal data (e.g., time-series data) and create corresponding contracts based on the extracted specifications. These contracts can possibly include contracts that may have been overlooked by the user and can signal any loopholes in the design and operations of the network elements. These contracts (or specifications) are intuitive to the user as they can be easily expressed in natural language.

The network design system 150 can generate the contracts dynamically as time evolves because the network can undergo changes. These contracts (as well as temporal logics describing the contracts) can adapt to the changes. For example, traffic conditions and driving scenarios vary with time. The dynamically generated contracts (as well as the temporal logics describing the contracts) are able to accurately represent real-time behaviors or conditions and hence can be used to predict which nodes are likely to experience an anomaly in the near future. The prediction can be characterized by a series of reductions in a robustness of a network element with respect to its contracts, or the user can formulate a contract that describes anomalies in the network element.

In a further example, when the network design system 150 predicts that a failure is about to occur on an edge server 140, data on the edge server 140 needs to be offloaded to "k" neighboring edge servers 140 without violating their individual specifications within next "t" time units. When this happens, some of the edge servers 140 and the cloud server 110 may experience a decrease in the robustness with regards to their contracts. To provide guarantees on the resilience of the network, a contract described by hyper temporal logics can be formulated so that whenever an anomaly occurs, the edge servers 140 and the overall network are able to "recover" within a short time interval. The recovery process can involve offloading data to other edge servers 140, thereby increasing the robustness of each edge server 140 and the cloud server 110 for their respective contracts. An example contract for a group of edge servers 140 can be stated in hyper temporal logics as follows:

$$C:=G(\text{anomaly} \rightarrow F\,[0,T](\text{recover})). \tag{7}$$

This contract describes that "in the event of an anomaly, the group needs to be able to recover to normal operation within T time units." This contract is a contract for network resilience.

The behavior patterns of the network identified by hyper temporal logics are used in (1) analysis of group behavior during execution of tasks and (2) prediction of future group behavior under similar situations. They are also useful in applications where only a certain number of edge servers 140 in different subgroups of a population (e.g., a proportion of all the edge servers 140) are of interest while different edge servers 140 in a subgroup are interchangeable.

Example properties of the network that can be analyzed using formal techniques include, but are not limited to the following:

Consistency—the number of edge servers 140 that satisfy a global contract should not fluctuate drastically through time;

Frequency—the number of time points at which the behavior of any edge server 140 satisfies its respective contract is large; and Specificity—a-priori information about general tasks can be used to make the tasks more specific and customized to the user's preferences and behavior (e.g., to differentiate vehicular tasks and non-vehicular tasks).

A second example use case of the network design system 150 is in availability-cost tradeoff and dynamic resource allocation. Example common types of data from connected vehicles that require services from edge computing networks are listed in Table 2 of FIG. 6B. For some services that may need less network availability, a cost-effectiveness can be prioritized. On the other hand, some other services (e.g., ADAS, cruise assist, etc.) require full network-service availability regardless of the cost. These considerations call for more diverse network options to balance availability and cost.

The network design system 150 can formulate contracts to guarantee availability of the network for vehicle data. For example, a contract can describe that "there is at least X amount of resources always available for M number of vehicles or tasks." These contracts facilitate the process to design networks that can dynamically allocate resources for each edge server 140 depending on the types of data and importance levels of the data. For example, when there are only a few vehicles in the AoC of an edge server 140, the network design system 150 can allocate more communication channel resources towards non-vehicle data (such as video or music streaming). Of course, the services need to align with rules and regulations regarding data locality and data sovereignty where the data is collected and processed. Compliance requirements for data hosting differ among countries, and depending on these requirements, data locality might differ between services and locations.

Modern distributed services provide users with high flexibility in adding or removing resources (e.g., virtual machine, virtual memory, etc.). Despite such flexibility, it is still a challenge for the users to manually configure parameters for such operations (e.g., adding or removing resource or computing power) for a large distributed system due to the complexity and large volumes of data. These parameters need to be continuously updated over time to meet the varying demand, to save costs and to increase the system reliability. The network design system 150 provides an automatic way to optimize a synthesized specification that identifies how much of resources should be added or removed by analyzing the big data. The automatically generated specification and optimized parameter choices are used to dynamically set the parameters over time on behalf of the users.

A third example use case of the network design system 150 is in Vehicle-to-Cloud (V2Cloud) cruise assist or Vehicle-to-Cloud-to-Vehicle (V2C2V) cruise assist. This application is a time-sensitive and safety-critical application that requires services through edge servers 140 or RSUs 142. In this application, (temporal, dynamic or static) vehicle data is collected by corresponding RSUs 142 or edge servers 140 in the region. The RSUs 142 or edge servers 140 can create local information (e.g., localized high-definition map information) and update it continuously based on various data that is collected locally. This local information can be used by local vehicles in a specific location (e.g., a small town, crossroad, specific area of highway, etc.) for collision avoidance, cruise control for platooning, etc. The network design system 150 may create a set of contracts and configure the edge servers 140 and the RSUs 142 so that the set of contracts is satisfied so as to meet requirements on latency, availability and computational power, etc., of this application.

A fourth example use case of the network design system 150 is in Mobility-as-a-Service (MaaS). MaaS relies on local edge servers 140 to provide real-time navigations (e.g., traffic flow control by road authorities). This application is another safety-critical application that requires uninterrupted operations and services of the distributed V2X network. The network design system 150 can take various operating conditions into consideration. The network design system 150 can perform real-time distributed network health monitoring on the V2X network with dynamic specifications that change according to the operating conditions of the edge servers 140. Example operating conditions include a condition when an edge server 140 is non-operational, a condition when the edger server 140 is overloaded and is to balance the network load, and a condition when the edge server 140 creates backups, etc. Further example operating conditions include a condition when the edge server 140 is underutilized, and a condition when the edge server 140 is in maintenance, etc.

Example Processes

Figure 3:
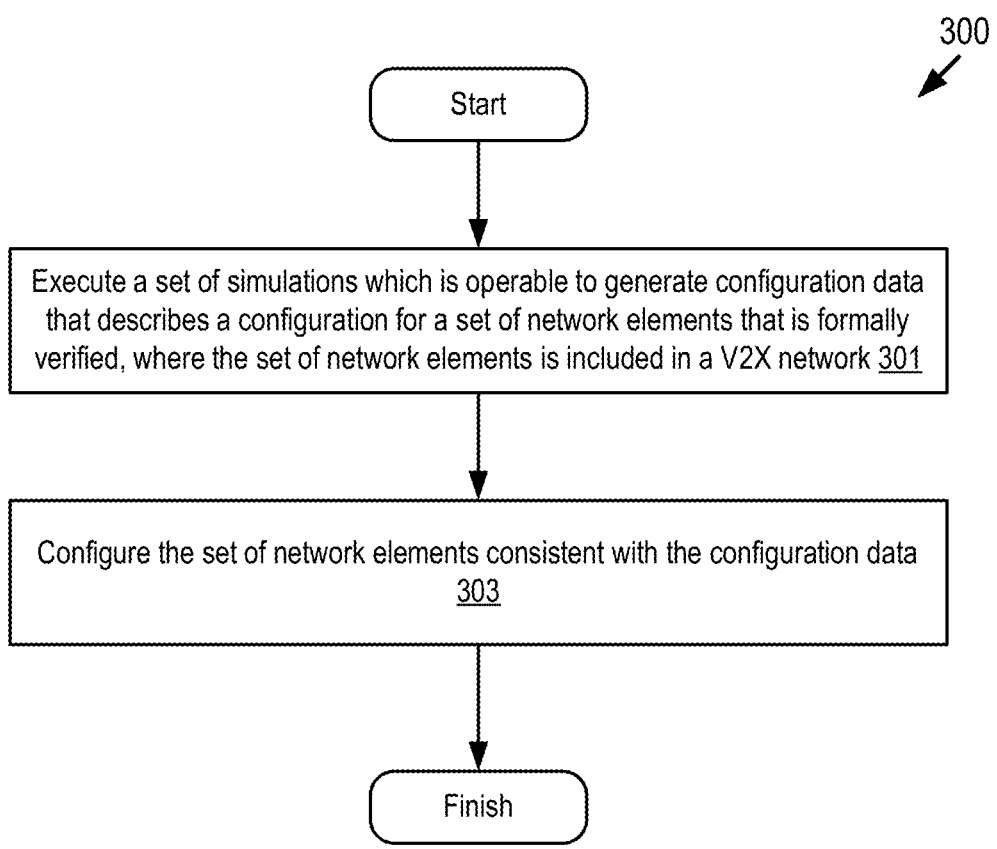
FIG. 3 depicts a method for designing and configuring network elements for a V2X network according to some embodiments.

Referring now to FIG. 3, depicted is a flowchart of an example method 300 for designing and configuring network elements for a V2X network according to some embodiments. The steps of the method 300 are executable in any order, and not necessarily the order depicted in FIG. 3.

At step 301, the configuration determination module 165 executes a set of simulations which is operable to generate configuration data that describes a configuration for a set of network elements that is formally verified. The set of network elements is included in the V2X network.

At step 303, the configuration setting module 171 configures the set of network elements consistent with the configuration data.

Figure 4A:
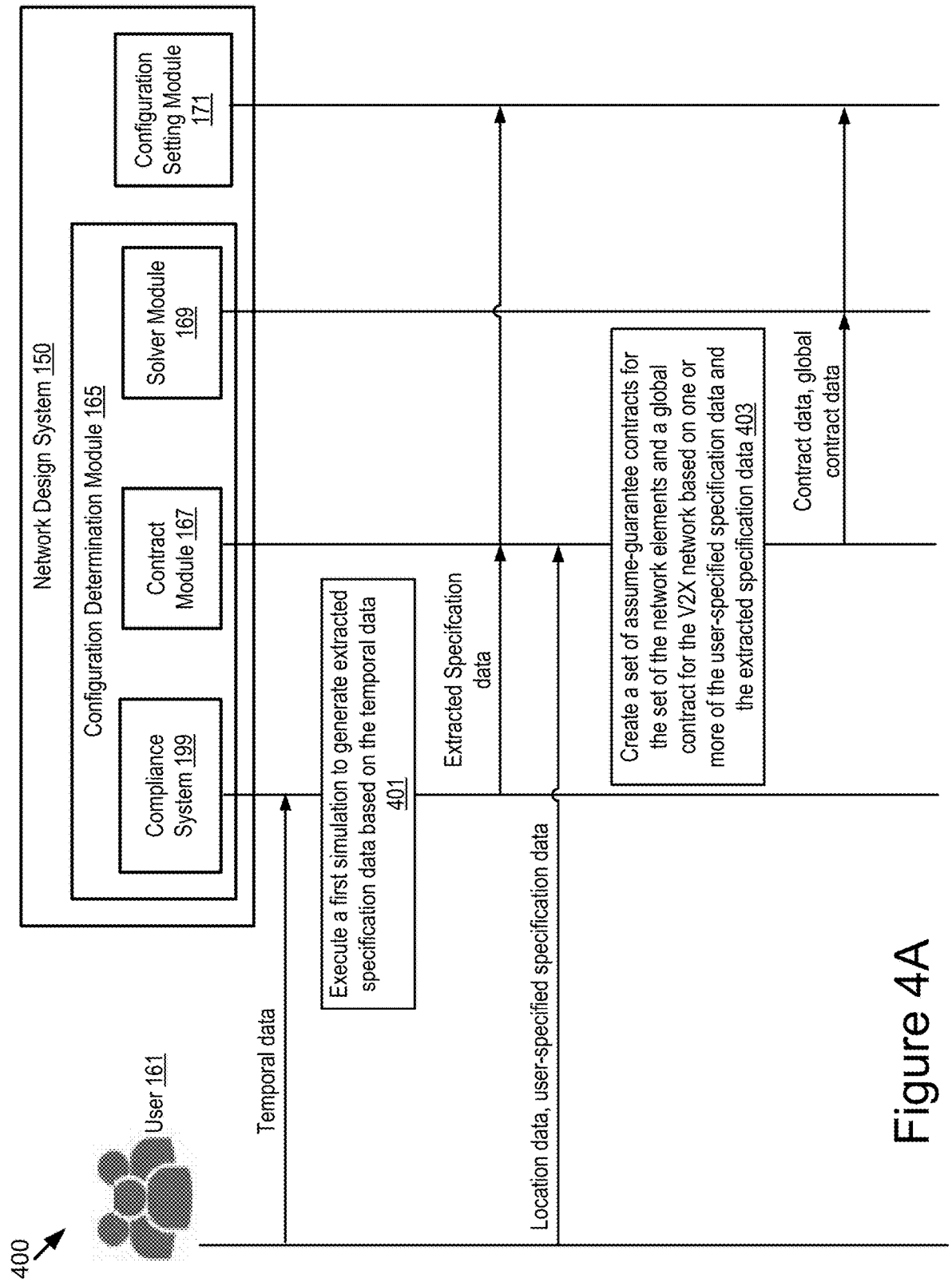
FIGS. 4A-4B depict an operational sequence for designing and configuring network elements for a V2X network according to some embodiments.
Figure 4B:
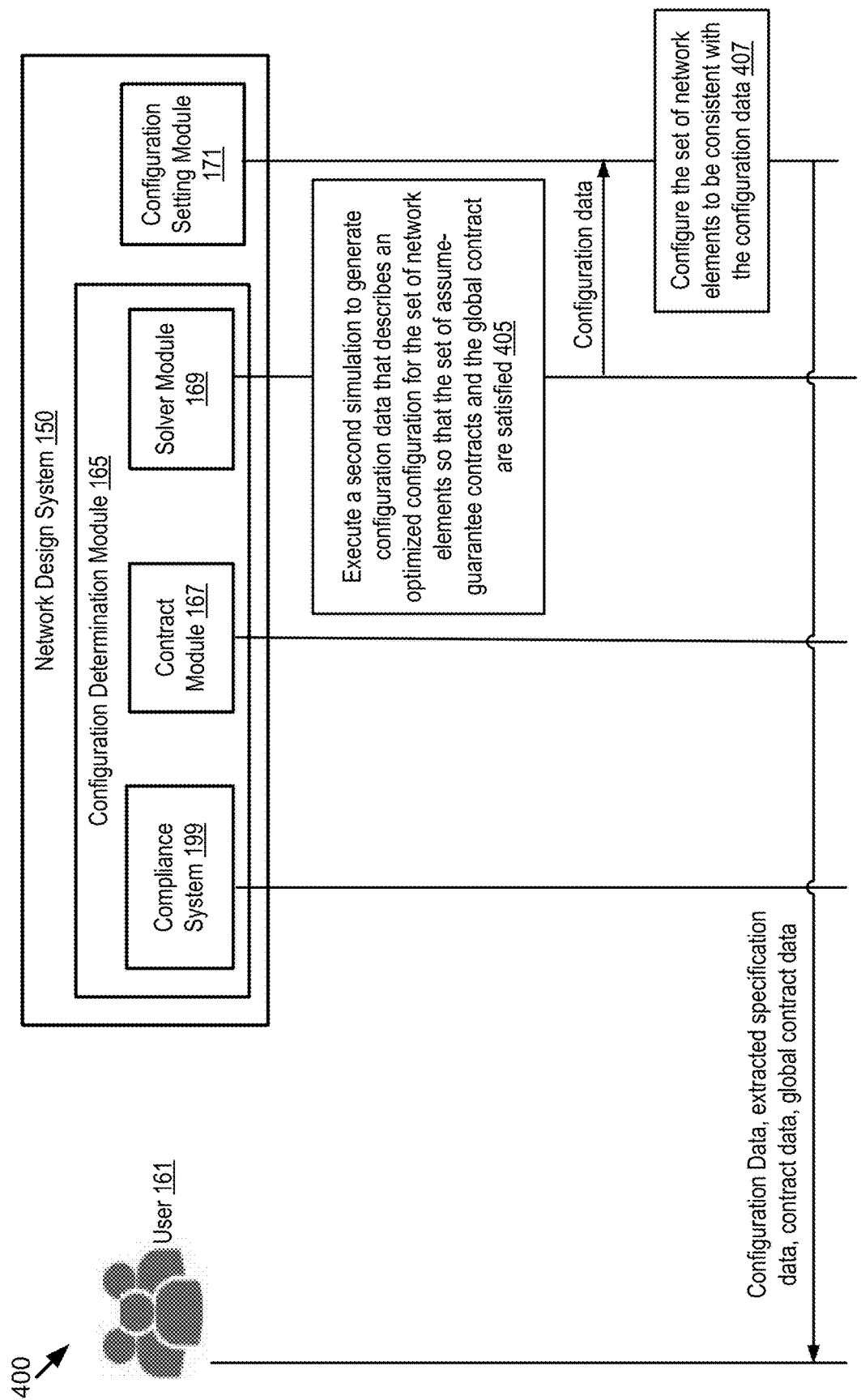

FIGS. 4A-4B depict an operational sequence 400 for designing and configuring network elements for a V2X network according to some embodiments. The steps of the operational sequence 400 are executable in any order, and not necessarily the order depicted in FIGS. 4A-4B.

Referring to FIG. 4A, the user 161 may provide temporal data to the network design system 150. In some embodiments, the temporal data is obtained from data that is collected in the real world. In some embodiments, the temporal data is obtained through simulations. At step 401, the compliance system 199 executes a first simulation to generate extracted specification data based on the temporal data. The compliance system 199 sends the extracted specification data to one or more of the contract module 167 and the configuration setting module 171.

The user 161 may also provide (1) location data describing locations and AoCs of a set of network elements and (2) user-specified specification data for the set of network elements to the contract module 167. At step 403, the contract module 167 creates a set of assume-guarantee contracts for the set of the network elements and a global contract for the V2X network based on one or more of the user-specified specification data and the extracted specification data. For example, the contract module 167 creates one or more user-specified assume-guarantee contracts based on the user-specified specification data. The contract module 167 also creates one or more extracted assume-guarantee contracts based on the extracted specification data.

The contract module 167 sends contract data describing the set of contracts and global contract data describing the global contract to one or more of the solver module 169 and the configuration setting module 171.

Referring to FIG. 4B, at step 405, the solver module 169 executes a second simulation to generate configuration data that describes an optimized configuration for the set of network elements so that the set of assume-guarantee contracts and the global contract are satisfied. The solver module 169 sends the configuration data to the configuration setting module 171.

At step 407, the configuration setting module 171 configures the set of network elements to be consistent with the configuration data. The configuration setting module 171 may send one or more of the configuration data, the extracted specification data, the contract data and the global contract data to the user device 120 for the user's review.

Figure 5:
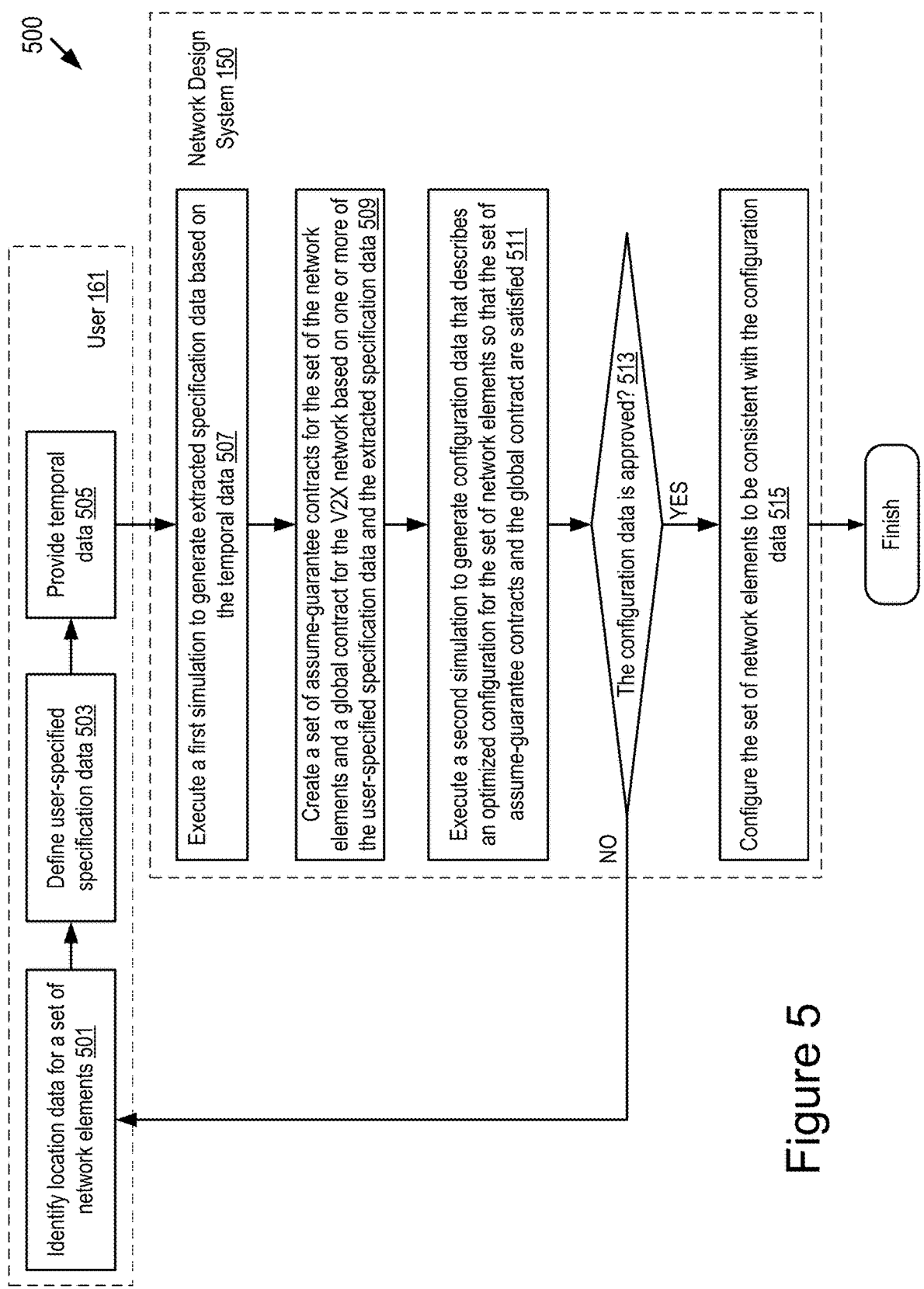
FIG. 5 depicts a flowchart for designing and configuring network elements for a V2X network according to some embodiments.

FIG. 5 depicts a flowchart 500 for designing and configuring network elements for a V2X network according to some embodiments. The steps of the flowchart 500 are executable in any order, and not necessarily the order depicted in FIG. 5.

At step 501, the user 161 identifies location data for a set of network elements.

At step 503, the user 161 defines user-specified specification data for the set of network elements.

At step 505, the user 161 provides temporal data to the network design system 150.

At step 507, the compliance system 199 executes a first simulation to generate extracted specification data based on the temporal data.

At step 509, the contract module 167 creates a set of assume-guarantee contracts for the set of the network elements and a global contract for the V2X network based on one or more of the user-specified specification data and the extracted specification data.

At step 511, the solver module 169 executes a second simulation to generate configuration data that describes an optimized configuration for the set of network elements so that the set of assume-guarantee contracts and the global contract are satisfied.

At step 513, the configuration setting module 171 determines whether the configuration data is approved (e.g., approved by the user 161). Responsive to the configuration data being approved, the flowchart 500 moves to step 515. Otherwise, the flowchart 500 moves back to step 501 for further refinement of the configuration data.

At step 515, the configuration setting module 171 configures the set of network elements to be consistent with the configuration data.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory of a computer system storing computer-executable code that, when executed by a processor, causes the processor to:
   execute a first simulation to generate extracted specification data based on temporal data associated with a Vehicle-to-Everything (V2X) network;
   create a set of assume-guarantee contracts for a set of network elements based on one or more of a user-specified specification data or the extracted specification data;
   execute a second simulation to generate configuration data that describes an optimized configuration for the set of network elements so that the set of assume-guarantee contracts and a global contract is satisfied, wherein the set of network elements is included in the V2X network; and
   configure the set of network elements consistent with the configuration data.

2. The computer program product of claim 1, wherein the set of network elements includes a plurality of edge servers.

3. The computer program product of claim 1, wherein the computer-executable code further causes the processor to provide a user with the configuration data, the extracted specification data, assume-guarantee contracts data, and global contract data.

4. The computer program product of claim 1, wherein the computer-executable code further causes the processor to receive from a user types of data to be considered when designing a configuration for the set of network elements.

5. A method comprising:
   executing a first simulation to generate extracted specification data based on temporal data associated with a Vehicle-to-Everything (V2X) network;
   creating a set of assume-guarantee contracts for a set of network elements based on one or more of a user-specified specification data or the extracted specification data;
   executing a second simulation to generate configuration data that describes an optimized configuration for the set of network elements so that the set of assume-guarantee contracts and a global contract is satisfied, wherein the set of network elements is included in the V2X network; and
   configuring the set of network elements consistent with the configuration data.

6. The method of claim 5, further comprising providing a user with the configuration data, the extracted specification data, assume-guarantee contracts data, and global contract data.

7. The method of claim 5, wherein the first simulation and the second simulation include a plurality of digital twin simulations.

8. The method of claim 5, wherein a connected vehicle transmits a wireless communication using the V2X network which is configured based on the configuration data.

9. The method of claim 5, wherein the configuration data is formally verified because the set of assume-guarantee contracts and the global contract are satisfied.

10. The method of claim 9, further comprising receiving from a user types of data to be considered when designing a configuration for the set of network elements.

11. The method of claim 9, wherein the global contract ensures that each network element described by the set of assume-guarantee contracts behaved according to requirements detailed in the set of assume-guarantee contracts.

12. The method of claim 11, wherein the requirements detailed in the set of assume-guarantee contracts are for data generation, traffic rates, and response times.

13. A system comprising:
   a computer system including a non-transitory memory storing computer code which, when executed by the computer system, causes the computer system to:
   execute a first simulation to generate extracted specification data based on temporal data associated with a Vehicle-to-Everything (V2X) network;
   create a set of assume-guarantee contracts for a set of network elements based on one or more of a user-specified specification data or the extracted specification data;
   execute a second simulation to generate configuration data that describes an optimized configuration for the set of network elements so that the set of assume-guarantee contracts and a global contract is satisfied, wherein the set of network elements is included in the V2X network; and configure the set of network elements consistent with the configuration data.

14. The system of claim 13, wherein the set of network elements includes a plurality of edge servers.

15. The system of claim 13, wherein the first simulation and the second simulation include a plurality of digital twin simulations.

16. The system of claim 13, wherein a connected vehicle transmits a wireless communication using the V2X network which is configured based on the configuration data.

17. The system of claim 13, wherein the configuration data is formally verified because the global contract and the set of assume-guarantee contracts for the set of network elements are satisfied.

18. The system of claim 17, wherein the computer code further causes the computer system to receive from a user types of data to be considered when designing a configuration for the set of network elements.

19. The system of claim 17, wherein the global contract ensures that each network element described by the set of assume-guarantee contracts behaved according to requirements detailed in the set of assume-guarantee contracts.

20. The system of claim 19, wherein the requirements detailed in the set of assume-guarantee contracts are for data generation, traffic rates, and response times.

* * * * *